United States Patent
Ishigaki et al.

(10) Patent No.: US 6,523,833 B1
(45) Date of Patent: Feb. 25, 2003

(54) LOW LOAD SEAL

(75) Inventors: Tsuneo Ishigaki, Yawara-mura (JP); Mamoru Fukuda, Yawara-mura (JP); Yasuyuki Nishimura, Arida (JP); Kazumasa Nishida, Arida (JP)

(73) Assignees: Mitsubishi Cable Industries, Ltd., Amagasaki (JP); SMC Corporation, Tokyo (JP)

( * ) Notice: Subject to any disclaimer, the term of this patent is extended or adjusted under 35 U.S.C. 154(b) by 0 days.

(21) Appl. No.: 09/547,403

(22) Filed: Apr. 11, 2000

(30) Foreign Application Priority Data

Apr. 12, 1999 (JP) .......................... 11-103841
Mar. 24, 2000 (JP) .......................... 2000-083907

(51) Int. Cl.⁷ .............................. F16J 15/02
(52) U.S. Cl. ................ 277/650; 277/644; 277/641; 277/549; 277/551; 277/552; 277/560; 277/566; 277/626
(58) Field of Search .................. 277/644, 549, 277/551, 552, 560, 566, 626, 641, 642, 648

(56) References Cited

U.S. PATENT DOCUMENTS

| | | | | |
|---|---|---|---|---|
| 3,214,182 A | * | 10/1965 | Herbruggen | 277/465 |
| 3,575,431 A | * | 4/1971 | Bryant | 277/641 |
| 4,123,068 A | * | 10/1978 | Van Gorder | 277/436 |
| 4,921,258 A | * | 5/1990 | Fournier et al. | 277/615 |
| 5,180,008 A | * | 1/1993 | Aldridge et al. | 277/322 |
| 5,328,178 A | * | 7/1994 | Nies | 277/438 |
| 5,445,393 A | * | 8/1995 | Ramberg | 277/643 |
| 5,482,297 A | * | 1/1996 | Burns et al. | 277/644 |
| 6,129,358 A | * | 10/2000 | Kiesel et al. | 277/436 |
| 6,264,206 B1 | * | 7/2001 | Hashizawa et al. | 277/641 |
| 6,273,231 B1 | * | 8/2001 | Koschmieder et al. | 192/85 CA |

FOREIGN PATENT DOCUMENTS

| | | |
|---|---|---|
| JP | 3-127866 | 12/1991 |
| JP | 10-311430 | 11/1998 |

* cited by examiner

*Primary Examiner*—Lynne H. Browne
*Assistant Examiner*—Matthew E. Rodgers
(74) *Attorney, Agent, or Firm*—Armstrong, Westerman & Hattori, LLP

(57) ABSTRACT

A ring-shaped low load seal attached into a ring-shaped dovetail groove having an opening portion, a first side wall face, a second side wall face, and a bottom wall face. This seal has a trileaf cross-sectional configuration composed of a first arc portion, a second arc portion, a protruding portion, and a concave portion disposed between the first arc portion and the second arc portion.

6 Claims, 6 Drawing Sheets

LOW LOAD SEAL

BACKGROUND OF THE INVENTION

1. Field of the Invention

This invention relates to a low load seal used for sealing of fluid.

2. Description of the Related Art

As a seal attached to a dovetail groove 31 of a trapezoid cross sectional configuration among various conventional seals, an O ring 30, as shown in FIGS. 9A through 9C, is generally used.

A seal 35 (disclosed in Japanese Utility Model provisional publication No. 3-127866) as shown in FIGS. 10A and 10B is known.

In the present invention, as shown in FIGS. 9A through 9C, the diameter of the O ring 30 is larger than depth of the dovetail groove 31 on a member 32, and a part of the O ring 30 protrudes from an opening portion of the dovetail groove 31. As shown in FIG. 9A, the O ring 30 does not fall out of the dovetail groove 31 because the diameter of the O ring 30 is larger than width of the opening portion of the dovetail groove 31. As shown in FIG. 9A, 30a is a parting line (flash) in forming to which the member 32 and member 33 come relatively close, as shown in FIG. 9B. The O ring 30 is pressed by a facing surface 34 of the member 33 to be squeezed and given a predetermined squeeze amount (rate), and fluid is sealed inside and outside of the O ring as a border.

As shown in FIG. 10A, the seal 35 disclosed in Japanese Utility Model provisional publication No. 3-127866 is formed in a cross-sectional configuration composed of a large arc portion 36 attached to the dovetail groove 31, and a pair of extruding portions 37, formed as to branch and extrude from the large arc portion 36 to the opening portion side of the dovetail groove 31. A sucker portion 39 is formed with the pair of extruding portions 37 and the concave portion 38. As shown in FIG. 10B, the member 32 and the member 33 come close to each other to press the sucker portion 39 onto the facing surface 34, and the sucker portion 39 adheres to the facing surface 34 by absorption to seal the fluid.

In the O ring 30, described with reference to FIG. 9, a large compression load is required to give the predetermined squeeze amount (which amount is distributed equally between the member 32, the member 33, and the O ring 30), sealing ability is decreased for deformation of mating faces of the members 32 and 33 (or permanent deformation of the O ring 30), and life of equipment (a semiconductor apparatus, for example) is shortened thereby. Further, the O ring 30 is difficult to attach because the diameter of the O ring 30 is larger than the width of the opening portion of the dovetail groove 31. The O ring 30 may be twisted in attachment, the parting line 30a may become the sealing face (the parting line 30a may contact the facing surface 34 of the member 33), and sealing ability may be spoiled.

In case of a gate valve in which the member 32 is a gate and the member 33 is a valve seat, a large difference is generated in the compression amount of the O ring 30 for dimensional tolerance of each part. Because the valve is composed of many parts, load excessively changes, and the mechanism is overplanned to resist the load. Further, insufficient compression amount in an assembled state may cause leaks, problems of increasing compression permanent deformation and dust, and generation of cracks due to excessive load, which works on the O ring 30. In the event that, both sides of the gate valve are atmosphere and vacuum or vacuum and vacuum, the position of the gate is changed by flection of the mechanism caused by pressure difference, compression amount of the O ring 30 is changed, and it is difficult to obtain an appropriate sealed state.

In the seal 35, described with reference to FIG. 10, it is necessary to elastically deform the large arc portion 36 significantly; namely, to give large squeeze amount because the sucker portion 39 is strongly pressed to the facing surface 34 by the elasticity of the large arc portion 36, as in FIG. 10B. Therefore, there is a problem in that the life of the equipment is shortened by high compression loads. Thus, the seal 35 can be easily damaged due to the strong force of members 32 and 33, between which extruding portions 37 are sandwiched.

A seal 40 shown in FIG. 11 (disclosed in Japanese Patent Provisional Publication Number 10-311430), which is fitted into a groove 41, of which a cross-sectional configuration is a rectangle having a shallow concave portion 42 on a bottom wall face side of the groove 41, and a half-circular protruding portion 43 on an opening portion side of the groove 41. The seal 40, of which the width on the opening portion side is set to be larger than the width of the groove 41 in unattached state, is compressed into the groove 41 to be prevented from falling off. With regard to the seal 40, pressing deformation of the half-circular protruding portion 43 is released by the concave portion 42. When the half-circular protruding portion 43 is pressed by the facing surface 34 of the member 33, a relatively large compression load is required to give the predetermined squeeze amount (rate). This is because the rate of width dimension $w_1$ of the half-circular protruding portion 43, when compared to the width dimension w of the groove 41, is large and the rate of the protruding dimension $h_1$ of the half-circular protruding portion 43 from the opening portion to depth dimension of the groove 41 is small.

It is therefore an object of the present invention, solving the problems above, to provide a low load seal having excellent attachability to a dovetail groove, prevented from being twisted when attached into the dovetail groove, and extending life of the equipment by demonstration of good sealing ability with low load.

BRIEF DESCRIPTION OF THE DRAWINGS

The present invention will be described with reference to the accompanying drawings in which.

DESCRIPTION OF THE PREFERRED EMBODIMENTS

Preferred embodiments of the present invention will now be described with reference to the accompanying drawings.

Figure 1:
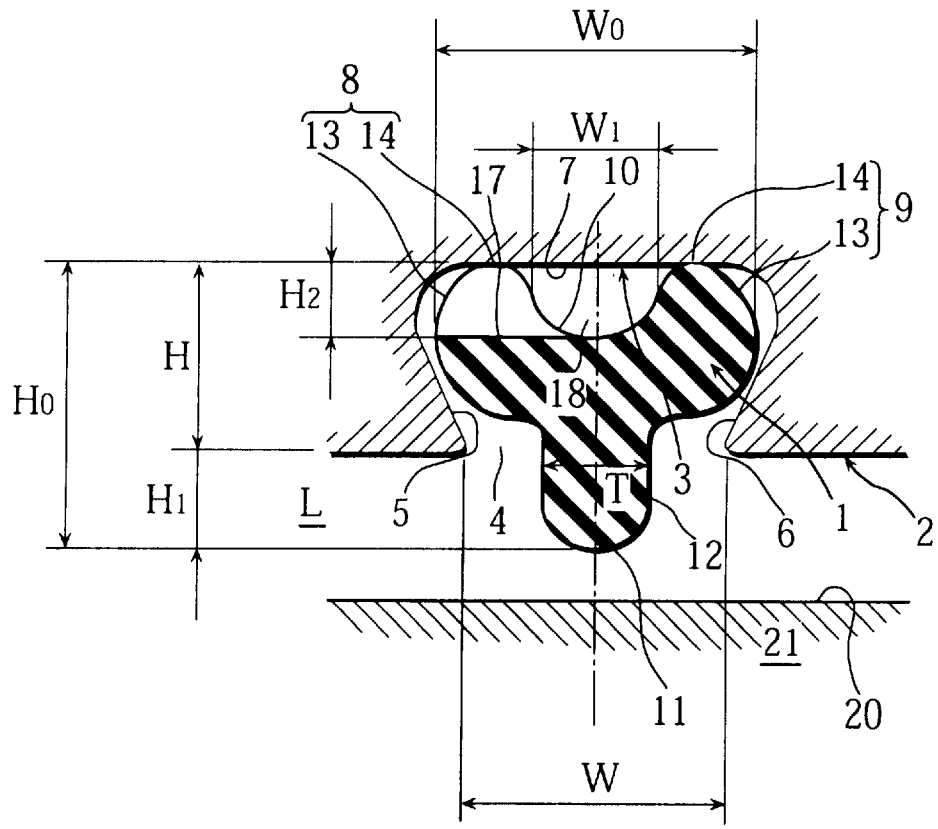
FIG. 1 is a cross-sectional view showing a preferred embodiment of the present invention.
Figure 2:
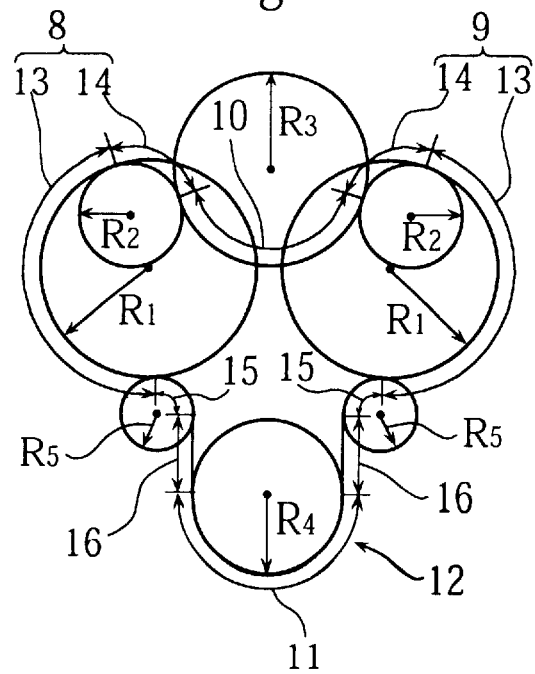
FIG. 2 is a construction view for description of a cross-sectional configuration of a low load seal relating to the present invention.

FIG. 1 shows a preferred embodiment of a low load seal of the present invention. This seal 1 is formed into a ring with an elastic body (such as rubber), used as a seal for open-close or fixed flange (such as a gate valve), for an apparatus used in the manufacturing of semiconductors, and attached into a dovetail groove 3, of which a cross-sectional configuration is a trapezoid formed on a seal attachment member 2, as shown in FIG. 1.

Figure 3:
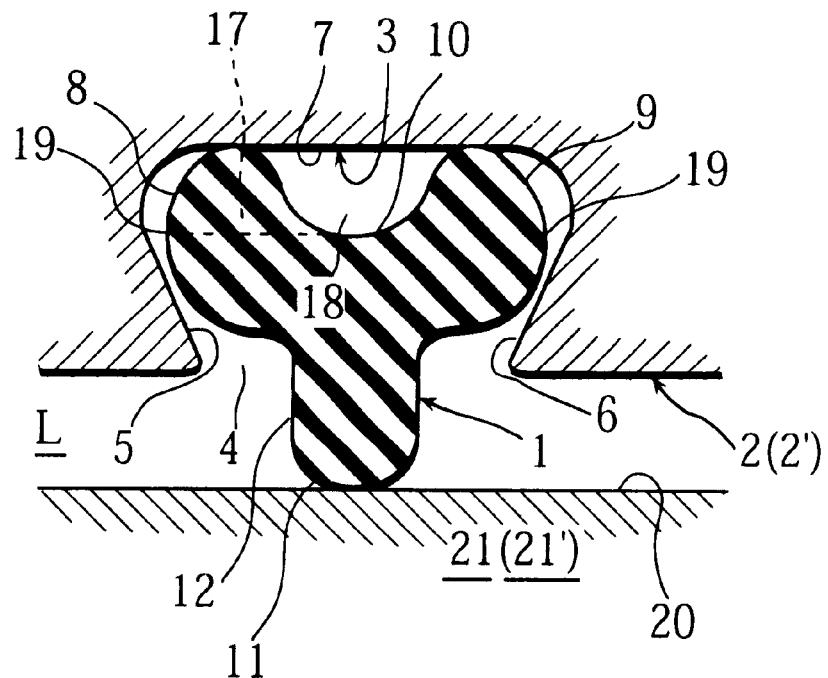
FIG. 3 is a cross-sectional view showing a state in which the seal contacts a facing surface.

As shown in FIG. 1 and FIG. 3, the cross-sectional configuration of the dovetail groove 3 of the seal attachment member 2 is a trapezoid having an opening portion 4, a first side wall face 5, a second side wall face 6, which come close to each other as they approach the opening portion 4, and a bottom wall face 7.

Next, the cross-sectional configuration of the seal 1 is described with reference to FIG. 1 through FIG. 4. This seal 1 has, in an attached state to the dovetail groove 3, a trileaf cross-sectional configuration (approximately Y-shaped cross-sectional configuration with rounded ends) composed of a first arc portion 8 on a peripheral side which extrudes to (as to close to or contact) the first side wall face 5 and contact the bottom wall face 7, a second arc portion 9 on an inner peripheral side which extrudes to (as to close to or contact) the second side wall face 6 and contact the bottom wall face 7, a concave portion 10 corresponding to the bottom wall face 7 and formed between the first arc port ion 8 and the second arc portion 9, and a protruding portion 12 between the first arc portion 8 and the second arc portion 9 protruding out of the groove through the opening portion 4 and having a tip arc portion 11.

In further detail, each of the first arc portion 8 and the second arc portion 9 is composed of a large diameter portion 13 having a radius $R_1$, and a small diameter portion 14 having a radius $R_2$. The concave portion 10 is formed into a concave curved face, of which the radius is $R_3$, and continue to the small diameter portions 14 of the first arc portion 8 and the second arc portion 9. The protruding portion 12 is composed of corner portions 15, each of which is formed into a concave curved face, of which radius is $R_5$, and continued to the large diameter portions 13 of the first arc portion 8 and the second arc portion 9, the tip arc portion 11 having a radius $R_4$, and straight connecting portions 16 connecting the tip arc portion 11 and the corner portions 15.

Figure 4:
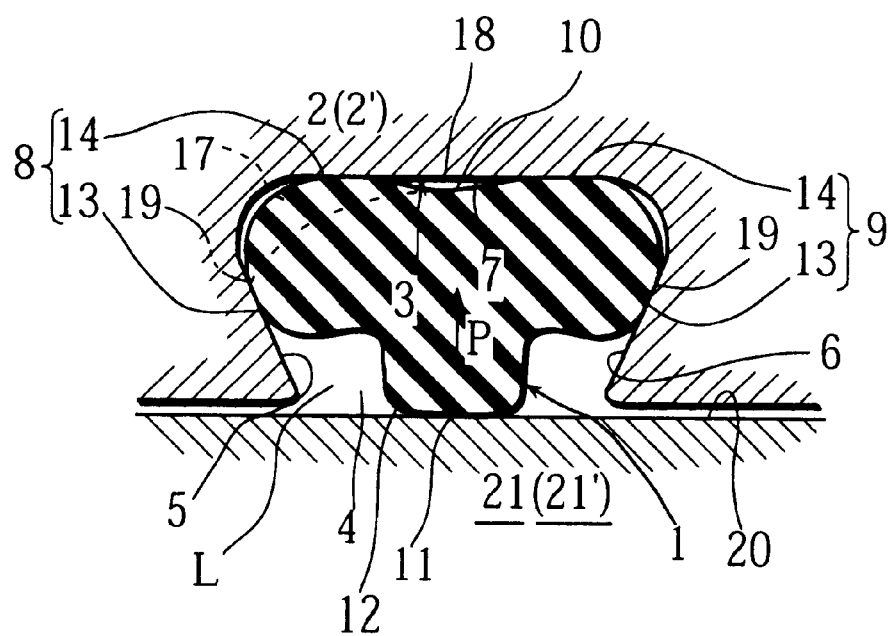
FIG. 4 is a cross-sectional view showing a sealed state.

One or more notched grooves 17 is formed on one of the first arc portions 8 and the second arc port ion 9, corresponding to a low pressure side L to release fluid in a gap portion 18, formed with the first arc portion 8, the concave portion 10, the second arc portion 9, and the bottom wall face 7 of the dovetail groove 3, to the low pressure side L through the notched groove 17. In the present embodiment, a notched groove 17 is formed on the first arc portion 8. Therefore, as shown in FIG. 4, the fluid in the gap portion 18 is sent to the low pressure side L through the notched groove 17. In FIGS. 1 through 4, the bottom portion of the notched groove 17 forms a straight line parallel to the bottom wall face 7 in cross section.

A parting line 19 in a circumferential direction of the seal is formed on a position wherein the first arc portion 8 corresponds to the first side wall face 5 of the dovetail groove 3, and in a position wherein the second arc portion 9 corresponds to the second side wall face 6 of the dovetail groove 3. In other words, the parting lines 19 (flash) formed on outer side faces of the first arc portion 8 and the second arc portion 9 are positioned within the dovetail groove 3 by attaching the seal 1 to the dovetail groove 3 (refer to FIG. 3 and FIG. 4).

The first arc portion 8 may contact or may not contact the first side wall face 5 in both of attached state and sealed state.

The second arc portion 9 may contact or may not contact the second side wall face 6 in both of attached state and sealed state.

Therefore, as shown in FIG. 1, the width dimension $W_0$ is set to be larger than the width dimension W of the opening portion 4 of the dovetail groove 3 so that the seal 1 does not fall out of the dovetail groove 3. When the seal 1 is attached to the dovetail groove 3, elastic deformation of the seal 1 in the width direction is made easy by the concave portion 10, the first and second arc portions 8 and 9 are closed to each other to diminish the width of the seal 1, and the attachment can be conducted smoothly.

The width dimension $W_1$ of the concave portion 10 is set to be 100% to 190% (preferably 100% to 150%) of thickness dimension T of the protruding portion 12, and the thickness dimension T of the protruding portion 12 is set to be 30% to 60% (preferably 30% to 50%) of the width dimension W of the opening portion 4 of the dovetail groove 3. The height dimension $H_0$, of the seal 1 is larger than the depth dimension H of the dovetail groove 3. The protruding dimension $H_1$ of the protruding portion 12 from the opening portion 4 of the dovetail groove 3 is set to be 40% to 90% (preferably 40% to 10%) of the depth dimension H of the dovetail groove 3. The notched groove 17 has notch depth dimension $H_2$ from the bottom wall face contact portion of the first arc portion 8 (the small diameter portion 14) to the parting line 19, as described with reference to FIG. 3.

FIG. 3 is an embodiment wherein the seal attachment member 2 and a contact member 21 come relatively close, and the tip arc portion 11 contacts a contact face 20 of the contact member 21. In this case, the seal serves as a gate valve, the seal attachment member 2 is referred as a gate 2', and the contact member 21 is referred as a valve seat 21'.

As shown in FIG. 4, the gate 2 and the valve seat 21' come closer, compression load (load in compression direction+ load in bending direction) works on the protruding portion 12 of the seal 1, the tip arc portion 11 is squeezed to the bottom wall face 1 side of the dovetail groove 3 (in an arrow P direction), the gap portion 18 diminishes, and the first and second arc portions 8 and 9 are deformed to be given a predetermined squeeze amount (rate).

Figure 5:
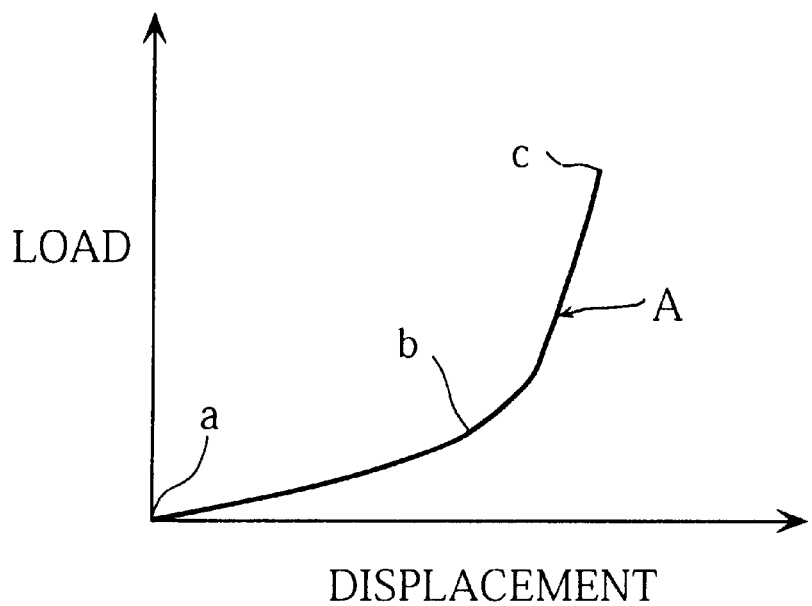
FIG. 5 is a graph showing displacement-load characteristic.

In this case, the load and displacement is are, as shown by a graph line A in FIG. 5, shown as a gentle (straight) displacement-load characteristic between a point a to a point b. In the embodiment of FIG. 4 (wherein seal 1 is compressed further), a steep displacement-load characteristic from point b to a point c of the graph line A, which is similar to that of the O ring (refer to FIG. 6), is shown. Thus, a high compression load is required. This is for prevention of contact between the gate 2' and the valve seat 21', and for generating foreign matter by the contact, even if the gate 2' and the valve seat 21' are regulated not to contact each other.

Figure 6:
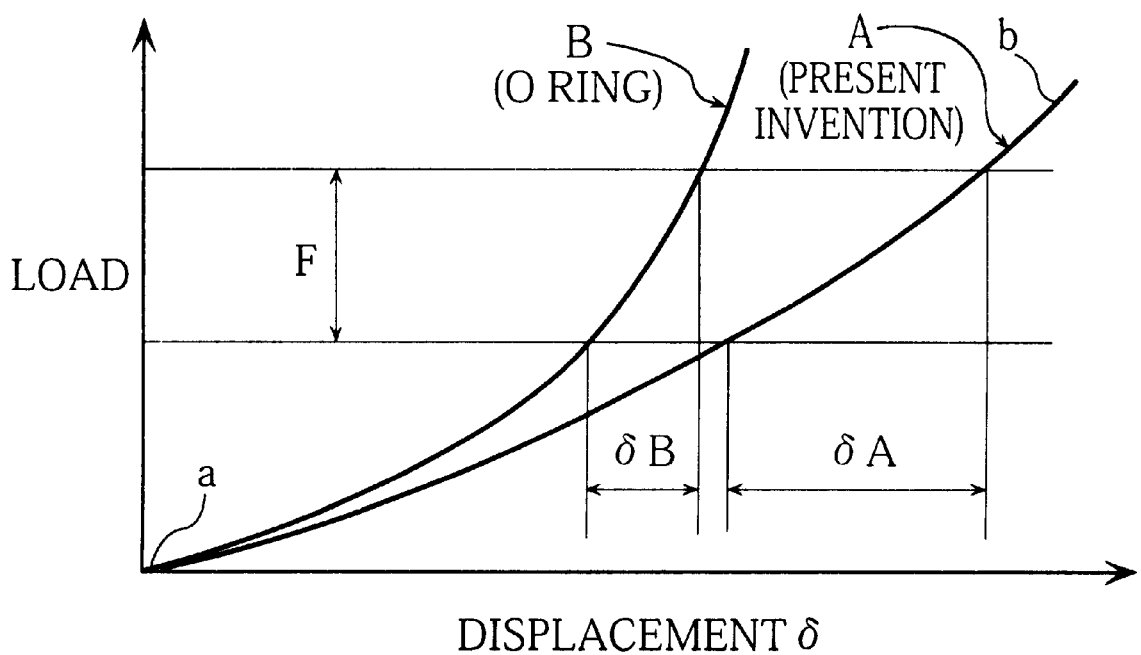
FIG. 6 is a graph comparing the seal with an O ring.

FIG. 6 is a graph for comparing the displacement-load characteristic of the low load seal of the present invention, shown with a graph line A, with displacement-load characteristic of an O ring, shown with a graph line B. When F is an allowable load (or design load), allowable displacement of the O ring is 6B, and allowable displacement of the present invention is 6A. In this case, 6A is greatly larger than 6B because the displacement-load characteristic of the present invention shown with the graph line A is a straight line in which load increases proportionally to displacement, while the displacement-load characteristic of the O ring shown with the graph line B is a quadratic curve in which load rapidly increases to displacement. Namely, this means that the present invention requires smaller force (lower load) than that of the O ring to give the predetermined squeeze amount.

Therefore, as shown in FIG. 4, the fluid is sealed with a border of the tip arc portion 11 of the seal 1 and the contact face 20 of the valve seat 21' and a border of the second arc portion 9 of the seal 1 and the dovetail groove 3 of the gate 2'. Concretely, the large diameter portion 13 and the small diameter portion 14 of the second arc portion 9 tightly fit to the second side wall face 6 and the bottom wall face 7 of the dovetail groove 3, respectively. In this case, the parting line 19 does not contact the contact face 20 because the seal 1 is not twisted; once attached to the dovetail groove 3. When the protruding port ion 12 contacts the contact face 20 and the tip arc portion 11 is squeezed, the predetermined squeeze amount is obtained with small compression load (as described above) wherein the concave portion deforms (contracts) to alleviate stress. This stress is concentrated to the seal 1 in a squeezed state, and sealing ability becomes good thereby, because the first arc portion 8, the second arc portion 9, and the tip arc portion 11 of the protruding portion 12 are formed in an R-configuration.

It is explained that the width dimension $W_1$ of the concave portion 10 is set to be 100% to 190% of the thickness dimension T of the protruding portion 12. This is because if it is less than 100%, the protruding portion 12 is hardly squeezed to the bottom wall face 1 side of the dovetail groove 3, and load in the compression direction of the protruding portion 12 becomes large. If it is more than 190%, sealing ability is spoiled for thickness of the first and second arc portions 8 and 9, and thus become thin.

Further, it is explained that the thickness dimension T of the protruding portion 12 is set to be 30% to 60% of the width dimension IV of the opening portion 4 of the dovetail groove 3. This is because, if it is less than 30%, problems are generated in sealing ability for the thickness of the thin protruding portion 12; the protruding portion 12 is easy to flex, and if it is more than 60%, compression load working onto the protruding portion 12 becomes excessive.

And, it is explained that the protruding dimension $H_1$ of the protruding portion 12 from the opening portion 4 of the dovetail groove 3 is set to be 40% to 90% of the depth dimension H of the dovetail groove 3. This is because if it is less than 40%, the squeeze amount is too little to maintain the sealing ability, and if it is more than 90%, load in compression direction hardly works for the thin, flexible protruding portion 12 and sealing ability is decreased thereby.

Next, FIG. 1 shows another preferred embodiment of the low load seal of the present invention. This seal 1 is also formed into a ring with an elastic body such as rubber, used as a seal for open-close or fixed flange such as a gate valve for a manufacturing apparatus of semiconductors, and attached into a dovetail groove 3 formed into a ring of which cross-sectional configuration is trapezoid formed on a seal attachment member 2.

In this embodiment, the cross-sectional configuration of the dovetail groove 3 of the seal attachment member 2 is a deformed ellipse, wherein a configuration made by cutting a long side of an ellipse for an opening portion 4, having the opening portion 4, a first side wall face 5 and a second side wall face 6 come close to each other as they approach the opening portion 4, and a bottom wall face 7. Curved face portions are formed on the first side wall face 5 and the second side wall face 6 from the bottom wall face 7 to the opening portion 4. That is to say, the dovetail groove 3 is applied to an O ring. This seal 1 corresponds to the dovetail groove 3 applied to an O ring.

Figure 8:
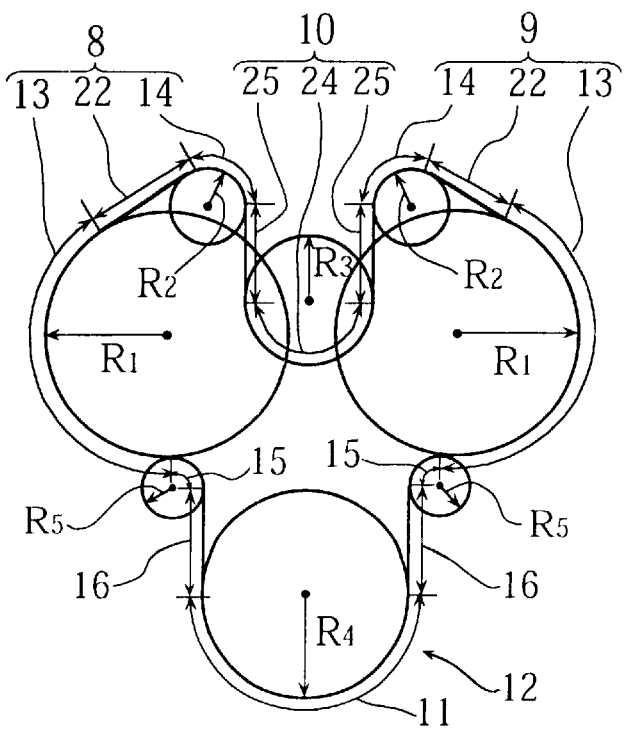
FIG. 8 is a construction view for description of a cross-sectional configuration of a low load seal.
Figure 9A:
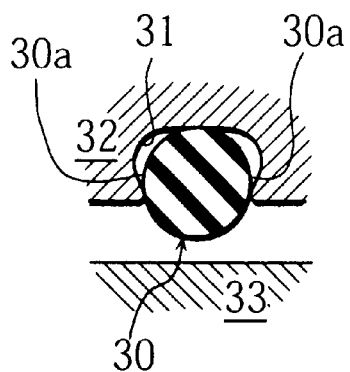
FIG. 9A is an explanatory view showing a first conventional example.
Figure 9B:
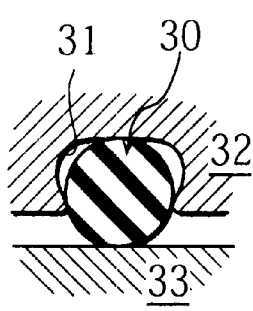
FIG. 9B is an explanatory view showing the first conventional example.
Figure 9C:
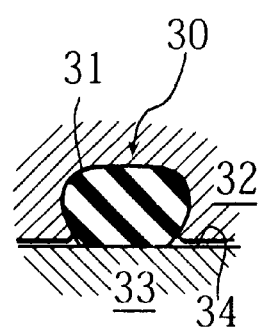
FIG. 9C is an explanatory view showing the first conventional example.
Figure 10A:
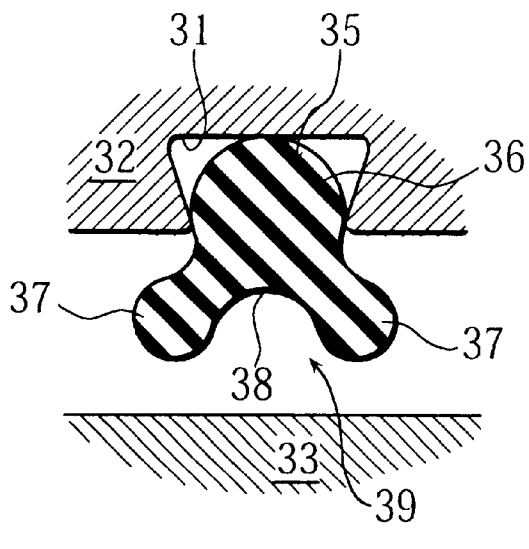
FIG. 10A is an explanatory view showing a second conventional example.
Figure 10B:
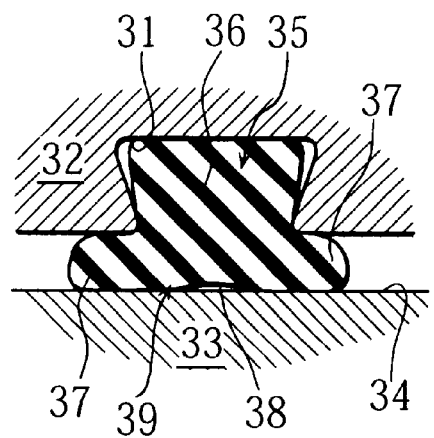
FIG. 10B is an explanatory view showing the second conventional example.
Figure 11:
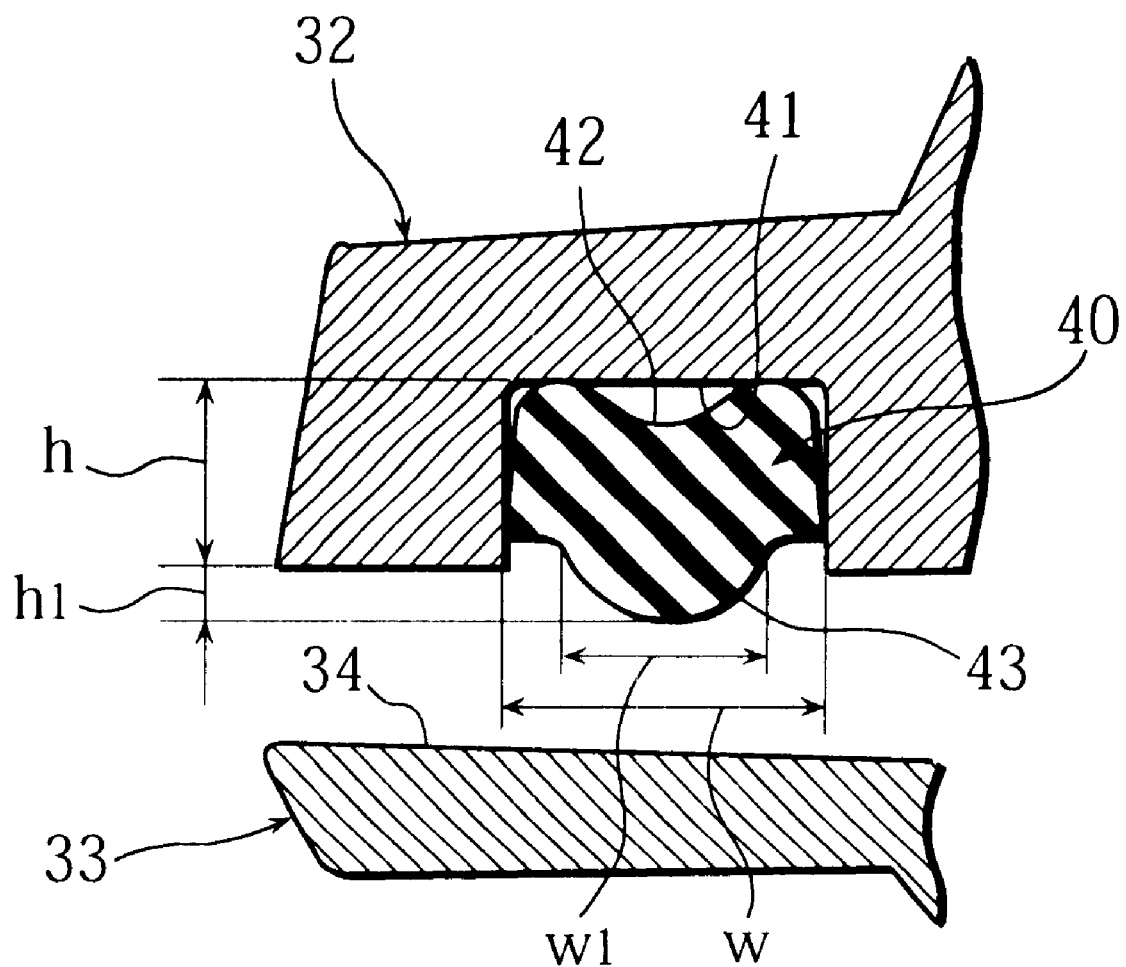
FIG. 11 is an explanatory view showing a third conventional example.

Next, a cross-sectional configuration of the seal 1 is described concretely with reference to FIG. 1 and FIG. 8. This seal 1 (as the seal described with reference to FIG. 1), in an attached state to the dovetail groove 3, has a trileaf cross-sectional configuration (approximately V-shaped cross-sectional configuration with rounded ends) composed of a first arc portion 8 on a peripheral side which extrudes to (as to close to or contact) the first side wall face 5 and contact the bottom wall face 1, a second arc portion 9 on an inner peripheral side which extrudes to (as to close to or contact) the second side wall face 6 and contact the bottom wall face 7, a concave portion 10 corresponding to the bottom wall face 7 and formed between the first arc portion 8 and the second arc portion 9, and a protruding portion 12 between the first arc portion 8 and the second arc portion 9 protruding out of the groove through the opening portion 4 and having a tip arc portion 11.

Further, each of the first arc portion 8 and the second arc portion 9 is composed of a large diameter portion 13 having a radius $R_1$, a small diameter portion 14 having a radius $R_2$, and a linear connecting portion 22 connecting the large diameter portion 13 and the small diameter portion 14. The concave portion 10 is composed of a concave curved face portion 24, of which radius is $R_3$, and linear connecting portions 25 connecting the small diameter portions 14 of the first arc portion 8 and the second arc portion 9. The protruding portion 12 is composed of corner portions 15, each of which is formed into a concave curved face of which radius is $R_5$ and continued to the large diameter portions 13 of the first arc portion 8 and the second arc portion 9, the tip arc portion 11 having a radius $R_4$, and straight connecting portions 16 connecting the tip arc portion 11 and the corner portions 15.

Figure 7:
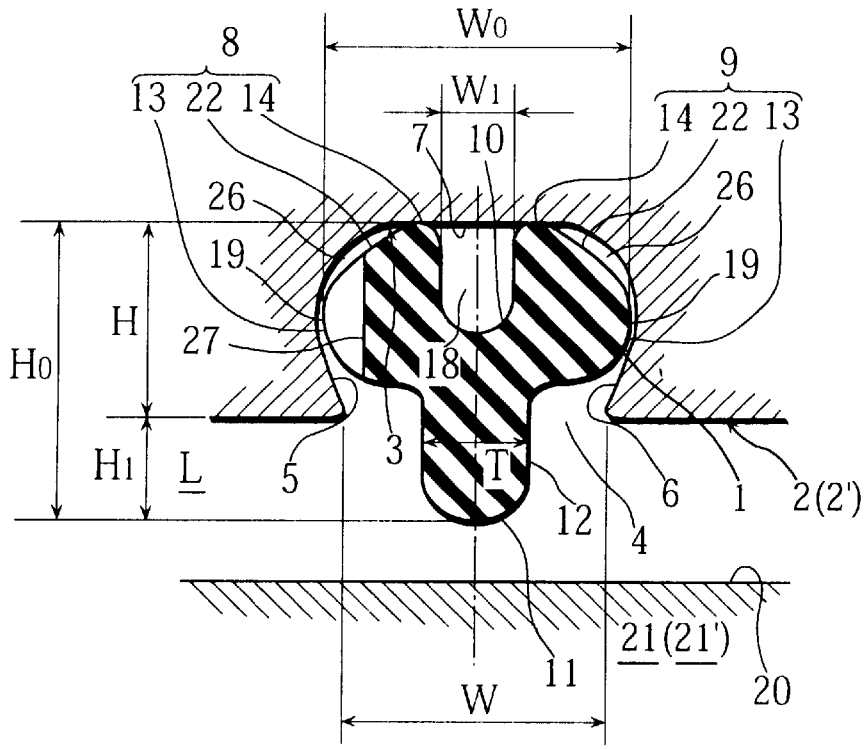
FIG. 7 is a cross-sectional view showing another preferred embodiment of the present invention.

One or more notched grooves 11 is formed on one of the first arc portions 8 and the second arc portions 9, corresponding to a low pressure side L, to release fluid in a gap portion 26 formed with the first arc portion 8 and the first side wall portion 5 of the dovetail groove 3. Or, alternatively, or in a gap portion 26 formed with the second arc portion 9 and the second side wall face 6 of the dovetail groove 3, to the low pressure side L, through the notched groove 17. In FIGS. 7 and 8, a bottom portion of the notched groove 17 forms a straight line at right angles with the bottom wall face 1 in cross section. In the present embodiment, the notched groove 17 is formed on the first arc portion 8 is shown. Therefore, the fluid in the gap portion 26 is sent to the low pressure side L through the notched groove 11. In this embodiment, at least one through hole (not shown in Figures) is disposed on the bottom wall face 7 of the dovetail groove 3 of the seal attachment member 2, and air in the gap portion 18 between the seal 1 and the dovetail groove 3 is released to the outside through the through hole.

A parting line 19 in a circumferential direction of the seal is formed on a position that the first arc portion 8 corresponds to the first side wall face 5 of the dovetail groove 3. Further, the second arc portion 9 corresponds to the second side wall face 6 of the dovetail groove 3. That is to say, the parting lines 19 (flash) formed on outer side faces of the first arc portion 8 and the second arc portion 9 are positioned within the dovetail groove 3 by attaching the seal 1 to the dovetail groove 3.

The first arc portion 8 may contact or may not contact the first side wall face 5 in both of attached state and sealed state.

The second arc portion 9 may contact or may not contact the second side wall face 6 in both of attached state and sealed state.

Therefore, as shown in FIG. 1, width dimension $W_0$ is set to be larger than the width dimension W of the opening portion 4 of the dovetail groove 3, so that the seal 1 does not fall out of the dovetail groove 3. When the seal 1 is attached to the dovetail groove 3, elastic deformation of the seal 1 in width direction is made easy by the concave portion 10, the first and second arc portions 8 and 9 are closed to each other to diminish the width of the seal 1, and the attachment can be conducted smoothly.

Width dimension $W_1$ of the concave portion 10 is set to be 60% to 100% (preferably 80% to 100%) of thickness dimension T of the protruding portion 12, and the thickness dimension I of the protruding portion 12 is set to be 30% to 60% (preferably 30% to 50%) of the width dimension W of the opening portion 4 of the dovetail groove 3. Height dimension $H_0$ of the seal 1 is larger than depth dimension H of the dovetail groove 3, and protruding dimension $H_1$ of the protruding portion 12 from the opening portion 4 of the dovetail groove 3 is set to be 40% to 90% (preferably 40% to 70%) of the depth dimension H of the dovetail groove 3.

Therefore, when the seal attachment member 2 and a contact member 21 come relatively close, and compression load (load in compression direction+load in bending direction) works on the protruding portion 12 of the seal 1, the tip arc portion 11 is squeezed to the bottom wall face 7 side of the dovetail groove 3, the gap portion 18 formed with the first arc portion 8, the second arc portion 9, and the bottom wall face 1 of the dovetail groove 3 diminish, and the first and second arc portions 8 and 9 are deformed to be given a predetermined squeeze amount (rate) (refer to FIG. 4). In this embodiment, each of the small diameter portions 14 of the first arc portion 8 and the second arc portion 9 tightly fits to the bottom wall portion I of the dovetail groove 3 to seal the fluid.

With reference to FIG. 1, it is explained that the width dimension $1W_1$ of the concave portion 10 is set to be 60% to 100% of the thickness dimension T of the protruding portion 12. This is because, if it is less than 60%, the protruding portion 12 is hardly squeezed to the bottom wall face 7 side of the dovetail groove 3, and load in the compression direction of the protruding portion 12 becomes large. If it is more than 100%, each of the small diameter portions 14 of the first and second arc portions 8 and 9 has a configuration which contacts the curved face portion of the first and second side wall faces 5 and 6 of the dovetail groove 3, a dovetail groove applied to an O ring, wherein irregularity is generated in height (the protruding dimension $H_1$ of the protruding portion 12), depending on the attached state of the seal 1 to the dovetail groove 3. It is explained that the thickness dimension T of the protruding portion 12 is set to be 30% to 60% of the width dimension W of the opening portion 4 of the dovetail groove 3. This is because if it is less than 30%, problems are generated in sealing ability due to the thickness of the thin protruding portion 12 and the flexible protruding portion 12. If it is more than 60%, compression load working onto the protruding portion 12 becomes excessive.

With reference to FIG. 1, it is explained that the protruding dimension $H_1$ of the protruding portion 12 from the opening portion 4 of the dovetail groove 3 is set to be 40% to 90% of the depth dimension H of the dovetail groove 3. This is because if it is less than 40%, the squeeze amount is too little to maintain the sealing ability, and if it is more than 90%, load in compression direction hardly works for the flexible protruding portion 12, and sealing ability is decreased thereby.

In the present invention, not restricted to the embodiments described above, the cross-sectional configuration of the first and second arc portions 8 and 9 may be arcs composed of only the large diameter portions 13, or, more than three circles drawn with slight increase or decrease of the radius $R_1$. Although the notched groove 17 or 27 is formed on the first arc portion 8 on the peripheral side, the notched groove 17 or 27 may be formed on the second arc portion 9 on the inner peripheral side.

The notched groove 17 described with reference to FIG. 1 may be applied to the seal 1, described with reference to FIG. 7. On the contrary, the notched groove 27 described with reference to FIG. 7 may be applied to the seal 1, described with reference to FIG. 1. Further, an L-shaped notched groove, in which the notched groove 17 parallel to the bottom wall face 7 of the dovetail groove 3, and the notched groove 27 at right angles with the bottom wall face 7 are connected, may be used.

According to the low load seal of the present invention, load change is decreased to large displacement of the seal 1, influence of the change in compression amount to sealing characteristics is little, and the sealing ability is excellent.

Low load is realized because appropriate load value is obtained, life of mechanisms, such as a valve, are extended. The valve can be light-weight, and the seal can be made with lower cost.

Accuracy in parallelness between facing sealed faces is not excessively required, and production of the seal is made easy thereby.

Contact of the seal attachment member 2 and the contact member 21 (for example, the gate 2' and the valve seat 21') can be prevented as in a conventional O ring, because the displacement-load characteristic is similar to that of an O ring when the compression load is large.

Deterioration of the seal itself is restricted because excessive stress is not generated for a small change in load.

The seal is attached to the dovetail groove 3 with good attachability and without being twisted.

Further, permanent compression deformation is decreased because elastic compression rate of the seal is lower than that of conventional O rings.

Finally, according to the low load seal of the present invention, when the seal is compressed, the fluid in the gap portion 18 can be smoothly sent to the low pressure side L. Therefore, the gap portion 18 is uniformly compressed without generating partial fluid remains, and leaks due to insufficient compression amount is are not generated.

When the seal is compressed, the fluid in the gap portion 26, formed with the first arc portion 8 and the first side wall face 5 of the dovetail groove 3, or, formed with the second arc portion 9 and the second side wall face 6 of the dovetail groove 3, can be smoothly sent to the low pressure side L.

The parting line 19 is not positioned onto sealed face (the contact face 20) because the seal 1 is attached to the dovetail groove 3 without being twisted, and thus, sealing ability is not spoiled.

While maintaining this sealing ability, optimum compression amount (squeeze amount) can be obtained with low load. Accordingly, a low load seal corresponding to the dovetail groove 3 for O ring (shown in FIG. 7), of which cross-sectional configuration is a deformed ellipse, can be obtained, and the seal 1 of the present invention can be used without remaking the dovetail groove 3 for an O ring, as used in conventional apparatuses.

Further, abrasion is not generated as in O rings and dust generation is restricted because the tip of the protruding portion 12 can bear the flection. Moreover, the impact of sealing is reduced because distance in the seal 1, from start to end of the sealing, is long and load change has linearity. Therefore, the seal of the present invention is appropriately used in producing a gate valve for conveying wafers.

While preferred embodiments of the present invention have been described in this specification, it is to be understood that the invention is illustrative and not restrictive, because various changes are possible within the spirit and indispensable features.

What is claimed is:

1. A low-load circular seal with a tri-leaf cross-sectional configuration being attached to an attachment member that has a ring-like dovetail groove with a trapezoidal cross-sectional configuration, said dovetail groove comprising an opening portion, a first side-wall face, a second side-wall face, and a bottom-wall face, said seal comprising;

a first arc portion extruding toward the first side-wall face and touching the bottom-wall face;

a second arc portion extruding toward the second side-wall face and touching the bottom-wall face; a concave portion corresponding to the bottom-wall face being formed between the first arc portion and the second arc portion; and a protruding portion with no more than one tip arc portion, formed on an opposite side to the concave portion between the first arc portion and the second arc portion, protruding beyond the opening portion.

2. The low load circular seal as set forth in claim 1, wherein at least one notched groove being formed on by one of the first arc portion and the second arc portion adjacent a low pressure side, and a gap portion being formed by the first arc portion, the concave portion, the second arc portion, and the bottom wall face of the dovetail groove, wherein fluid is released from the gap portion to the low pressure side through the at least one notched groove.

3. The low load circular seal as set forth in claim 1, wherein at least one notched groove being formed by one of the first arc portion and the second arc portion adjacent a low pressure side, and one of a first gap portion being formed by the first arc portion and the first side wall face and a second gap portion being formed by the second arc portion and the second side wall face, wherein fluid is released from one of the first gap portion and the second gap portion to the low pressure side through the at least one notched groove.

4. The low load circular seal as set forth in claim 1, wherein a parting line is formed by a position between the first arc portion and the first side wall face and a position between the second arc portion and the second side wall face.

5. The low load circular seal as set forth in claim 1, wherein a width dimension of the concave portion is between 60% and 190% of a thickness dimension of the protruding portion.

6. The low load circular seal as set forth in claim 1, wherein a thickness dimension of the protruding portion is between 30% and 60% of a width dimension of the dovetail groove, and wherein a protruding dimension of the protruding portion from an opening dimension of the dovetail groove is between 40% and 90% of a depth dimension of the dovetail groove.

* * * * *